United States Patent [19]

Takekado

[11] Patent Number: 5,003,419
[45] Date of Patent: Mar. 26, 1991

[54] MAGNETIC HEAD SUPPORTING MECHANISM

[75] Inventor: Shigeru Takekado, Tokyo, Japan

[73] Assignee: Kabushiki Kaisha Toshiba, Kawasaki, Japan

[21] Appl. No.: 330,494

[22] Filed: Mar. 30, 1989

[30] Foreign Application Priority Data

Mar. 31, 1988 [JP] Japan .................. 63-078776

[51] Int. Cl.⁵ .............................................. G11B 5/48
[52] U.S. Cl. ..................................................... 360/104
[58] Field of Search ................................. 360/102–105

[56] References Cited

U.S. PATENT DOCUMENTS

| | | |
|---|---|---|
| 3,581,298 | 5/1971 | Billawala .......................... 360/103 |
| 4,058,843 | 11/1977 | Gyi ...................................... 360/103 |
| 4,151,573 | 4/1979 | Tandon et al. ....................... 360/104 |
| 4,306,258 | 12/1981 | Higashiyama et al. ............... 360/99 |
| 4,349,851 | 9/1982 | Higashiyama et al. ............. 360/105 |
| 4,379,315 | 4/1983 | Schuler ................................ 360/105 |
| 4,389,688 | 6/1983 | Higashiyama ....................... 360/104 |
| 4,791,501 | 12/1988 | Kumakura et al. ............. 360/104 X |
| 4,876,623 | 10/1989 | Takekado ............................ 360/104 |
| 4,882,644 | 11/1989 | Kimura et al. ...................... 360/104 |
| 4,905,111 | 2/1990 | Tuma et al. ......................... 360/126 |

FOREIGN PATENT DOCUMENTS 56-105358 8/1981 Japan.
62-22267 1/1987 Japan.

Primary Examiner—John H. Wolff
Attorney, Agent, or Firm—Foley & Lardner

[57] ABSTRACT

A magnetic head supporting mechanism capable of providing a satisfactory state of contact between the magnetic heads and the magnetic disk, while maintaining individual parts in good condition. The mechanism includes a gimbal for supporting each magnetic head on the carriage, including a head fixing portion on which one of the magnetic head is mounted; double thin plates surrounding the head fixing portion; a carriage fixing portion attached to the carriage; and a plurality of bridge connections connecting the head fixing portion, the double thin plates, and the carriage fixing portion together, such that the spring constant in a direction around the rolling axis is larger than the spring constant in a direction around the pitching axis. The mechanism may also include a gimbal including at least one portion of octagonal shape.

5 Claims, 5 Drawing Sheets

MAGNETIC HEAD SUPPORTING MECHANISM

BACKGROUND OF THE INVENTION

1. Field of the Invention

The present invention relates to a magnetic head supporting mechanism for supporting a magnetic head of a flexible magnetic disk memory device and, more particularly, to a gimbal structure of such a magnetic head supporting mechanism which supports the magnetic head on a carriage of the flexible magnetic disk memory device.

2. Description of the Background Art

In a conventional flexible magnetic disk memory device, one of a pair of magnetic heads is fixed and the other of the pair movably supported. This latter is elastically supported in a direction normal to a surface of a magnetic disk (up and down), a direction of rotation around an axis tangent to the disk (around a rolling axis), and a direction of rotation around an axis along the radius of the disk (around a pitching axis), as in that the described in U.S. Pat. No. 4,151,573.

Such a configuration has an advantage that the alignment of the fixed magnetic head becomes easier, but also has a disadvantage that the durability of the magnetic disk is impaired as the magnetic disk is forced to distort along with the magnetic head. If the elasticity of the magnetic disk is increased, proper head contact may not be achieved, so that the magnetic head floats over the magnetic disk. In addition, it is necessary to have an accurate positional relationship between the magnetic head and the magnetic disk.

On the other hand, there is a configuration in which both of the pair of magnetic heads are movably elastically supported in the up and down direction, the direction of rotation around the rolling axis, and the direction of the rotation around the pitching axis, as described in U.S. Pat. No. 4,306,258.

In this case, the elasticity in these three directions are obtained by means of a gimbal, whose deformation gives rise to head pressing load. However, it is impossible to have ample elasticity in all of the three directions in this configuration, as there is only one gimbal. Also, when the elasticity in two of the three directions is made large, it is necessary to have two magnetic heads of the pair accurately parallel in order to obtain a good contact between the magnetic heads and the magnetic disk, and if the magnetic heads are tilted due to some assembly error the head pressing load needs to be increased. But the increased head pressing load causes deformation on the gimbal, and the resulting non-linearity makes the elasticity in the up and down direction too large, so that it becomes almost like a fixed head configuration. This results in reduction of productivity and durability of the magnetic disk. Furthermore, vibrations of the magnetic heads due to their flaccidity makes the head contact unstable.

To cope with this situation, there are proposed solutions, such as those in Japanese Patent Laying Open No. S56-105358 and No. S62-22267, in which the nonlinearity is reduced by providing double gimbels; and that in Japanese Patent Laying Open No. S61-231762, by the present applicant, in which the spring constant around the rolling axis is made larger than that around the pitching axis, but further improvement is still required.

Thus, the conventional configuration is unable to provide a satisfactory state of contact between the magnetic heads and the magnetic disk, because of the insufficient consideration on the elastic supporting structure of the gimbal.

SUMMARY OF THE INVENTION

It is therefore an object of the present invention to provide a magnetic head supporting mechanism capable of providing a satisfactory state of contact between the magnetic heads and the magnetic disk, while maintaining individual parts in good condition.

According to one aspect of the present invention there is provided a magnetic head supporting mechanism for supporting a pair of magnetic heads to be brought into contact with a magnetic disk from top and bottom, comprising: a carriage movable in a direction of the radius of the magnetic disk, with respect to which the magnetic heads are to be supported; and gimbal means for supporting each magnetic head on the carriage, including: a head fixing portion on which one of the magnetic head is mounted; double thin plates surrounding the head fixing portion; a carriage fixing portion attached to the carriage; and a plurality of bridge connections connecting the head fixing portion, the double thin plates, and the carriage fixing portion together, such that the spring constant in a direction around the rolling axis is larger than the spring constant in a direction around the pitching axis.

According to another aspect of the present invention there is provided a magnetic head supporting mechanism for supporting a pair of magnetic heads to be brought into contact with a magnetic disk from top and bottom, comprising: a carriage movable in a direction of the radius of the magnetic disk, with respect to which the magnetic heads are to be supported; and gimbal means for supporting each magnetic head on the carriage, including at least one portion in octagonal shape.

Other features and advantages of the present invention will become apparent from the following description taken in conjunction with the accompanying drawings.

DETAILED DESCRIPTION OF THE PREFERRED EMBODIMENTS

Figure 1:
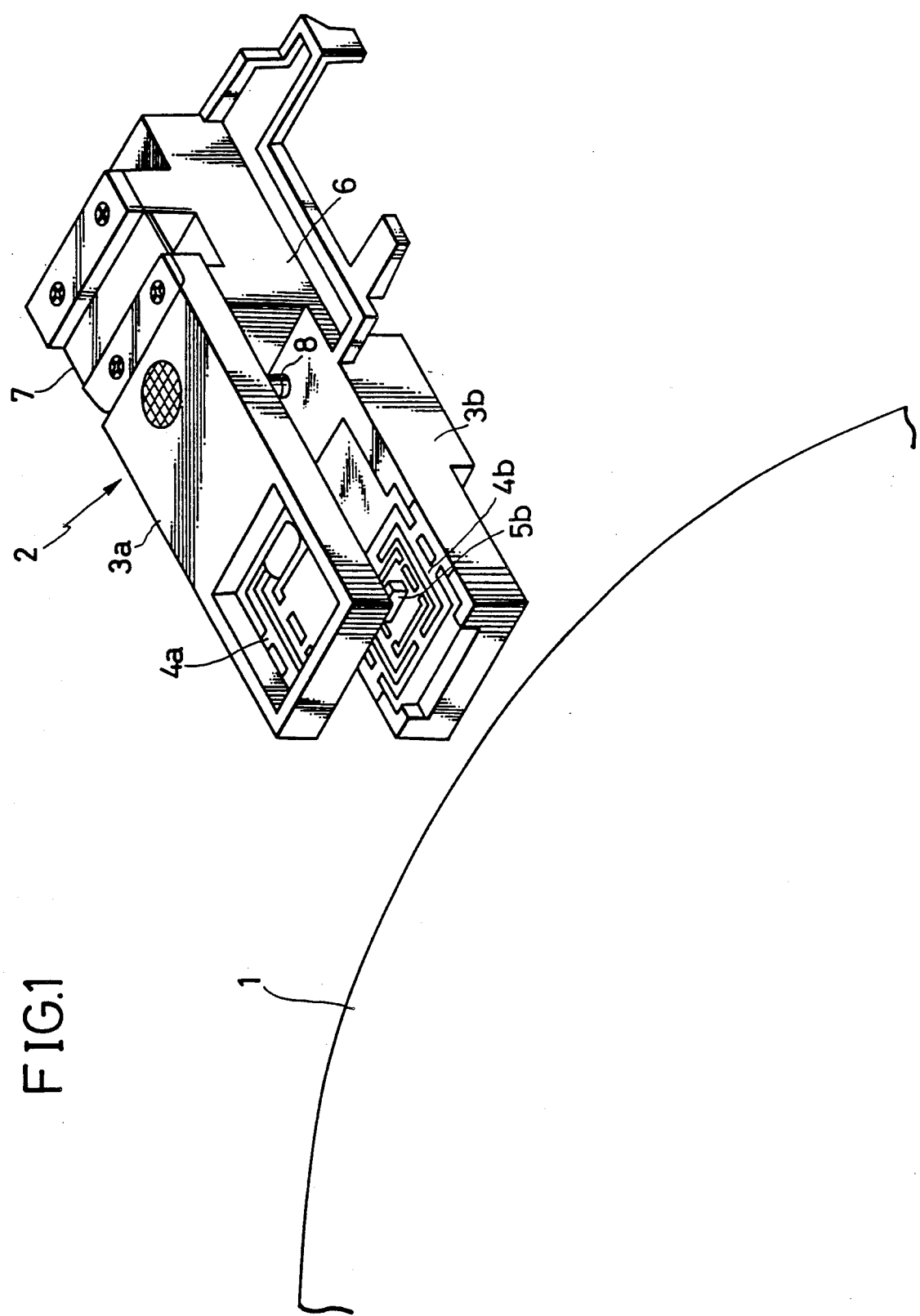
FIG. 1 is a perspective view of one embodiment of a magnetic head carriage according to the present invention.

Referring now to FIG. 1, there is shown one embodiment of a magnetic head carriage according to the present invention. In FIG. 1, the magnetic head carriage 2 is shown in its position with respect to a magnetic disk 1.

This magnetic head carriage 2 comprises an upper fixing arm 3a which approaches the magnetic disk 1 from top, an upper gimbal 4a attached on one end of the upper fixing arm 3a, an upper magnetic head 5a not visible in FIG. 1 attached at the center of a bottom face of the upper gimbal 4a, a lower fixing arm 3b which is located underneath the magnetic disk 1, a lower gimbal 4b attached on one end of the lower fixing arm 3b, a lower magnetic head 5b attached at the center of a top face of the lower gimbal 4b, an arm carriage 6 formed at another end of the lower fixing arm 3b on which another end of the upper fixing arm 3a is pivotally attached by a hinge 7, and a spring 8 provided between the upper fixing arm 3a and the lower fixing arm 3b which exerts a pulling force on the upper fixing arm 3a toward the lower fixing arm 3b.

When the magnetic disk 1 is set in the device, the upper fixing arm 3a is pivoted upwards against the pulling force by the spring 8 to extend over the top surface of the magnetic disk 1, and the upper fixing arm 3a is pulled toward the lower fixing arm 3b by the spring 8 again, until a root portion of the upper fixing arm 3a hits the top portion of the arm carriage 6, which limits the pivotal motion of the upper fixing arm 3a and fixes the upper fixing arm 3a.

Figure 2:
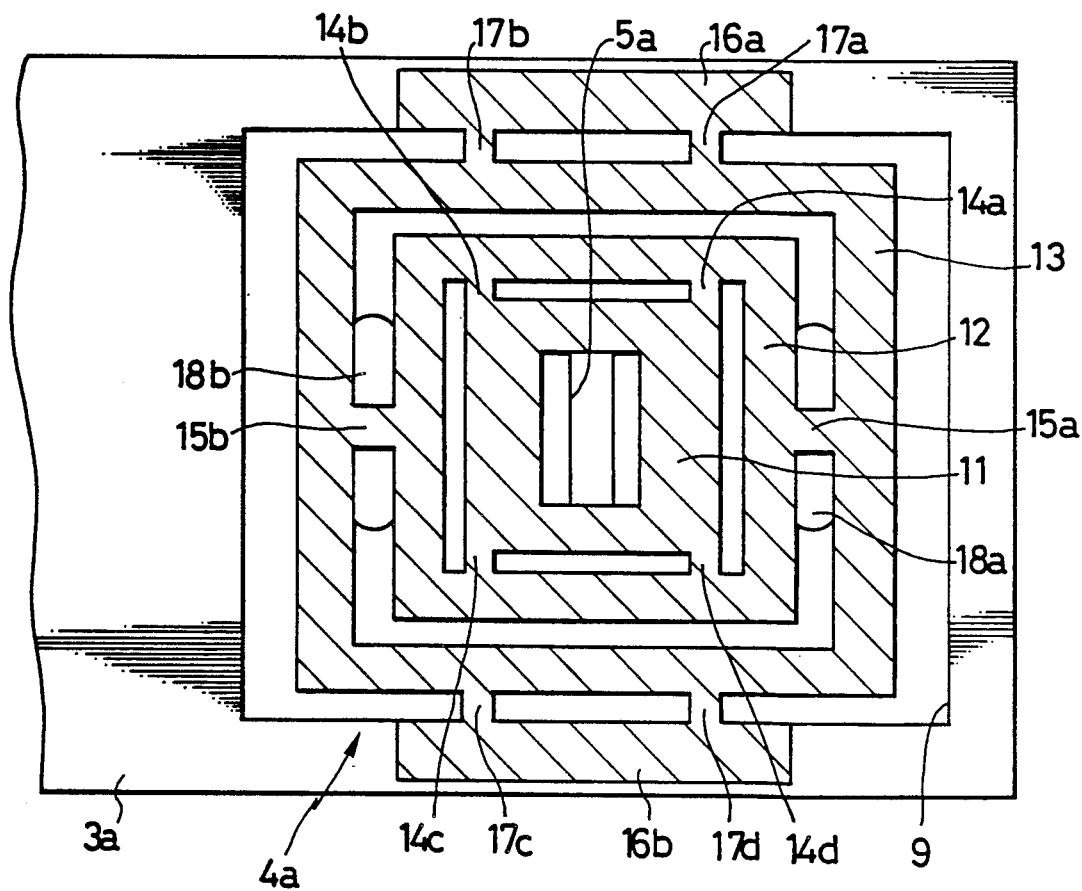
FIG. 2 is a top plan view of one embodiment of a gimbal according to the present invention.

Referring now to FIG. 2, the detailed structure of the upper and lower gimbals 4a and 4b will be explained. FIG. 2 shows the upper gimbal 4a viewed from below. The lower gimbal 4b has an identical structure as this upper gimbal 4a, so that the explanation will be given only for the upper gimbal 4a shown in FIG. 2.

The upper gimbal 4a is made of either an austenitic stainless steel or a copper alloy, and is in a form of a thin plate. This upper gimbal 4a is attached to the upper fixing arm 3a such that an opening 9 on the upper fixing arm 3a is covered by the upper gimbal 4a.

In the middle of the upper gimbal 4a, there is a head fixing portion 11 on which the upper magnetic head 5a is fixed. The head fixing portion 11 is surrounded by an inner thin plate portion 12 which is surrounded by an outer thin plate portion 13, so this is a double thin plate structure. The head fixing portion 11 and the inner thin plate portion 12 are connected by bridge connections 14a, 14b, 14c, and 14d at four corners of the head fixing portion 11, and the inner thin plate portion 12 and the outer thin plate portion 13 are connected by bridge connections 15a, and 15b at the middle of two sides of the inner thin plate portion 12 which are normal to the direction of the radius of the magnetic disk 1. There is also a pair of arm fixing portions 16a and 16b at the edges of the opening 9 which are along the direction of the radius of the magnetic disk 1. These arm fixing portions 16a and 16b are connected with the outer thin plate portion 13 through two pairs of bridge connections 17a and 17b, and 17c and 17d, respectively. Thus, the upper gimbal 4a is connected with the upper fixing arm 3a through the arm fixing portions 16a and 16b. There are also shock absorbers 18a and 18b which are thin plate shaped viscoelastic bodies such as a butyl rubber or a filled silicon placed at the location of the bridge connections 15a and 15b, respectively.

Now, the spring constant around the rolling axis of this gimbal structure will be explained.

The bridge connections 14a, 14b, 14c, and 14d connecting the head fixing portion 11 and the inner thin plate portion 12 are lying along a direction of scanning by the magnetic heads 5a and 5b, and there are sufficiently large distance separating the bridge connections 14a and 14b, and 14c and 14d. Other bridge connections 17a, 17b, 17c, and 17d connecting the inner thin plate portion 13 and the arm fixing portions 16a and 16b which are lying along a direction of scanning by the magnetic heads 5a and 5b also have sufficiently large distance separating the bridge connections 17a and 17b, and 17c and 17d. The spring constant around the rolling axis has a positive correlation with product of the elasticity in the up and down direction at the location of the bridge connections 14a, 14b, 14c, and 14d, and the square of the distance between the bridge connections 14a and 14b, 14c and 14d, 17a and 17b, and 17c and 17d. Since in this embodiment these distances are taken sufficiently large so that the spring constant around the rolling axis can be large.

On the other hand, the only bridge connections in the direction of the radius of the magnetic disk 1 are the bridge connections 15a and 15b connecting the inner thin plate portion 12 and the outer thin plate portion 13, so that the spring constant around the pitching axis is small.

Thus, in this gimbal structure of FIG. 2 the spring constant around the pitching axis is made small with respect to the spring constant around the rolling axis.

Because of this, off-trackings are eliminated and deviation of the bridge connections 15a and 15b from being parallel can be amply absorbed by the upper and lower gimbals 4a and 4b. As a result, only a small head pressing load is needed. This is because the head pressing load is positively correlated to a sum of the spring constants in two directions around the rolling axis and the pitching axis, so the smallness of the spring constant around the pitching axis in this gimbal structure keeps the head pressing load small, despite of the relative largeness of the spring constant around the rolling axis. This implies that the load on the magnetic disk 1 is also kept small so that the magnetic disk 1 can be maintained in good condition and thereby increasing its durability.

Also, since the upper and lower magnetic heads 5a and 5b are flexibly supported by the upper and lower gimbals 4a and 4b in the up and down direction as well as in two directions around the rolling axis and the pitching axis, so the upper and lower magnetic heads 5a and 5b can follow any warps on the magnetic disks 1. Thus, the good contact between the magnetic disk 1 and the magnetic heads 5a and 5b can be maintained.

The fact that the good contact between the magnetic disk 1 and the magnetic heads 5a and 5b can be maintained with only small head pressing load implies that even when the upper and lower magnetic heads 5a and 5b are not accurately parallel, the magnetic disk 1 will not be damaged by such a poor alignment of the upper and lower magnetic heads 5a and 5b.

Moreover, as the poor alignment of the upper and lower magnetic heads 5a and 5b can be effectively absorbed, the accuracy in assembling can be relaxed which simplifies the manufacturing process.

Also, the nonlinearity in the up and down direction can be suppressed as a length of a springing portion between the arm fixing portions 16a and 16b and the upper magnetic head 5a is made longer by the double thin plates structure of the gimbal. This is because the nonlinearity in the up and down direction is negatively correlated to the length of the springing portion between the arm fixing portions 16a and 16b and the upper magnetic head 5a. As a result, it is possible to maintain a sufficiently small spring constants in the up and down direction, even under the pressing load.

Furthermore, the use of fixing arm structure contribute to increase the stability against vibration.

In addition, the shock absorbers 18a and 18b at the location of the bridge connections 15a and 15b, respectively, can effectively absorb the vibrations.

Figure 3:
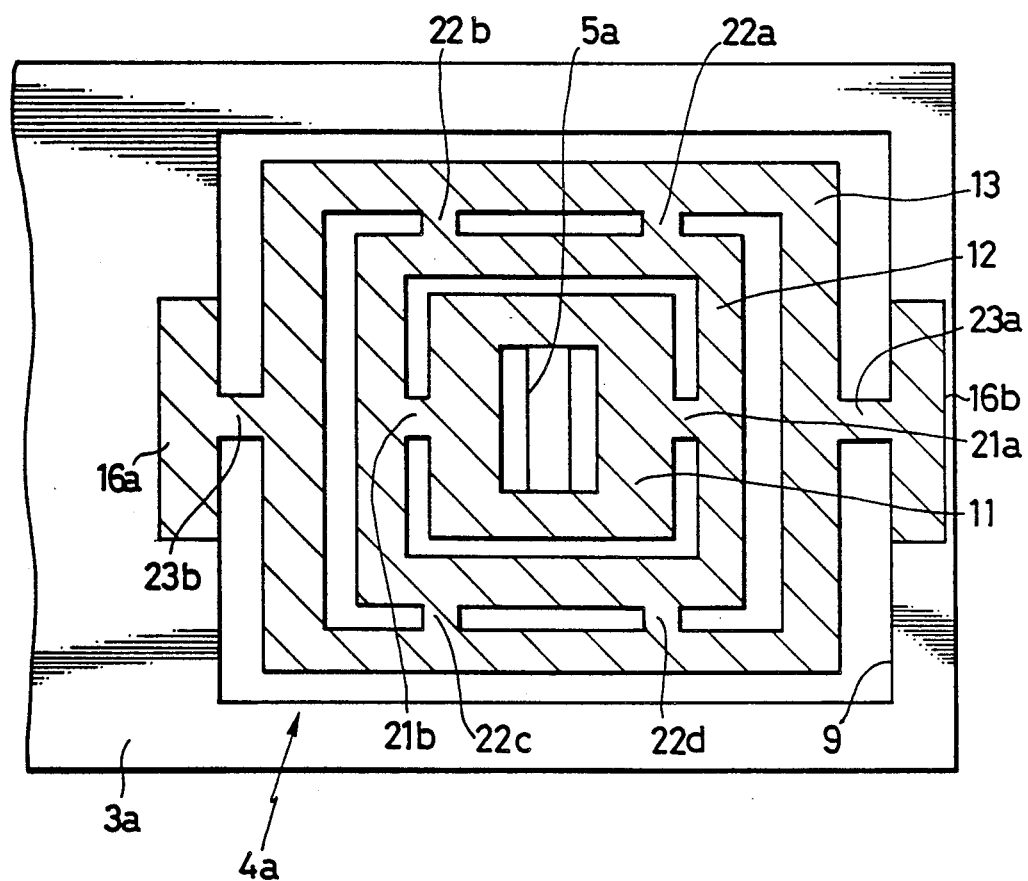
FIG. 3 is a top plan view of another embodiment of a gimbal according to the present invention.

Referring now to FIG. 3, there is shown second embodiment of the gimbal structure. Here, those parts which are equivalent to corresponding parts in the previous embodiment are given the same label in the figure and their explanation is not repeated.

In this second embodiment of the gimbal structure, the arm fixing portions 16a and 16b are attached at the edges of the opening 9 along the direction of the scanning, and correspondingly number and arrangement of the other bridge connections are changed. Thus, the head fixing portion 11 and the inner thin plate portion 12 are connected by bridge connections 21a and 21b at the middle of two sides of the head fixing portion 11 which are normal to the direction of the radius of the magnetic disk 1. The inner thin plate portion 12 and the outer thin plate portion 13 are connected by two pairs of bridge connections 22a and 22b, and 22c and 22d at two sides of the inner thin plate portion 12 which are in the direction of the radius of the magnetic disk 1. The arm fixing portions 16a and 16b are connected with the outer thin plate portion 13 through bridge connections 23a and 23b at the middle of two sides of the outer thin plate portion 13 along the direction of scanning.

As in the previous embodiment, the spring constant around the rolling axis is larger than the spring constant around the pitching axis in this second embodiment, so that the same advantages as mentioned above for the previous embodiment can also be enjoyed by this second embodiment.

Figure 4:
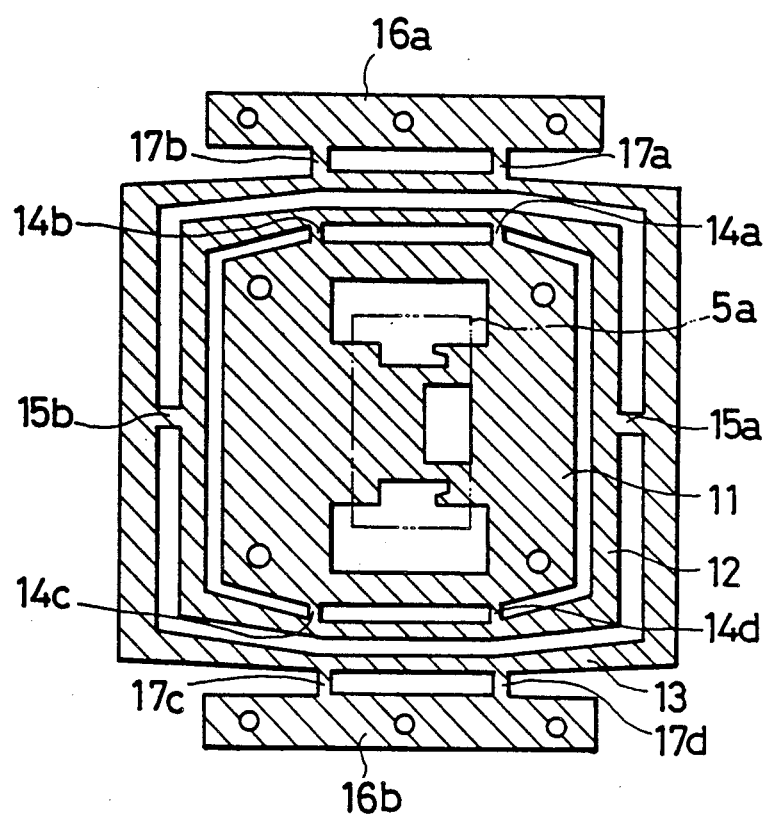
FIG. 4 is a top plan view of another embodiment of a gimbal according to the present invention.

Referring now to FIG. 4, there is shown a third embodiment of the gimbal structure. Here, again, those parts which are equivalent to corresponding parts in the previous embodiment are given the same labels in the figure and their explanation is not repeated.

This third embodiment of the gimbal structure differs from that of the first embodiment in that the head fixing portion 11, the inner thin plate portion 12, and the outer thin plate portion 13 are in octagonal shape, and that the inner thin plate portion 12, and the outer thin plate portion 13 are tapering toward the arm fixing portions 16a and 16b.

These features can improve spring characteristics of the gimbal without increasing its size. Namely, these features enable the spring constants in the direction of the radius of the magnetic disk 1, in the direction normal to that of the radius of the magnetic disk 1, and in the direction of rotation around the up and down axis, to increase while maintaining the appropriate spring constants in the up and down direction, in the direction of rotation around the rolling axis, and in the direction of rotation around the ptiching axis. This improves the accuracy of the head position and prevents a so called high pitch sound, an acoustic noise caused by the magnetic heads 5a and 5b touching on the magnetic disk 1.

In general, when the spring constants in the direction of the radius of the magnetic disk 1, in the direction normal to that of the radius of the magnetic disk 1, and in the direction of rotation around the up and down axis, are increased, the spring constants in the up and down direction, in the direction of rotation around the rolling axis, and in the direction of rotation around the pitching axis, also increase.

Now, it is desirable for a gimbal to have smaller size and spring constants. On the other hand, to reduce harmful vibrations such as high pitch sound and to increase the stability against the external vibration, it is desirable for the gimbal to have a higher resonant frequency.

Conventionally, the shape of the gimbal has been either circular or rectangular. With a given spring constant and the head, the circular gimbal can have a higher resonant frequency, but then it tend to occupy larger area. On the contrary, the rectangular gimbal can be made to occupy small area, but then its resonant frequency becomes low. In contrast to these conventional shape for the gimbal, the octagonal shape of this embodiment can have a higher resonant frequency while occupying the same area as the rectangular shape. This is because the spring constant is determined by the length of the gimbal, while the resonant frequency is determined by the length and shape of the gimbal. So for a given area, the length of the rectangular and octagonal shapes can be longer than that of the circular shape so that the spring constant can be made smaller. On the other hand, the resonant frequency in the direction of rotation around the up and down axis is low for the rectangular gimbal as its corners can easily be distorted, while it is high for the octagonal gimbal with strong corners. Tapering makes the spring constant smaller, but does not affect the resonant frequency.

Figure 5:
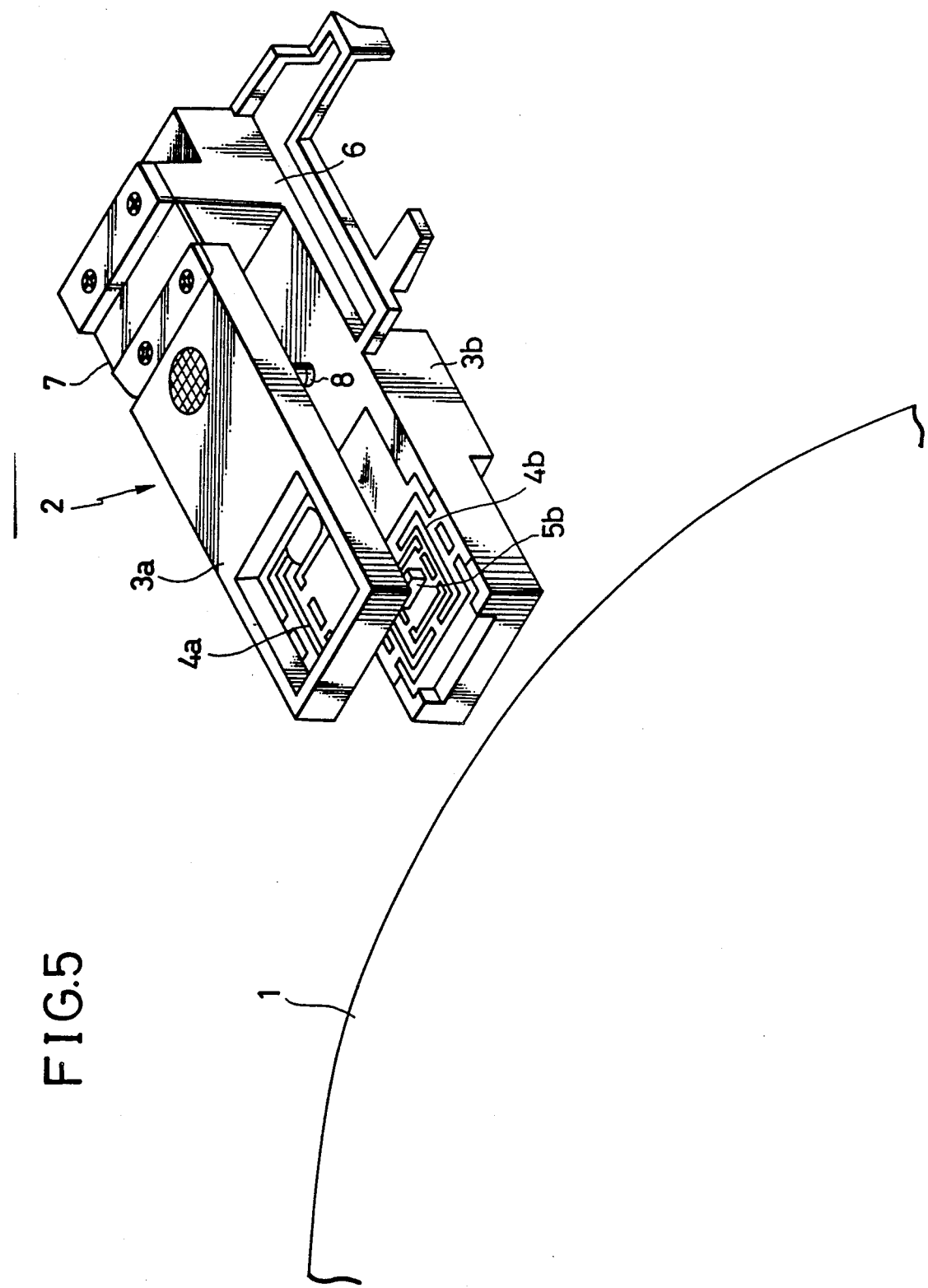
FIG. 5 is a perspective view of another embodiment of a magnetic head carriage according to the present invention.

Referring now to FIG. 5, there is shown another embodiment of the magnetic head carriage. Here, again, those parts which are equivalent to corresponding parts in the first embodiment are given the same label in the figure and their explanation is not repeated.

In this further embodiment of the magnetic head carriage, the arm carriage 6 is modified such that its top does not hit the upper fixing arm 3a to limit the pivotal motion of the upper fixing arm 3a. Thus, the upper fixing arm 3a is under the influence of the pulling force by the spring 8 without limit.

This difference does not affect the advantageous characteristics of the first embodiment, so that all the advantages of the first embodiment can also be enjoyed by this embodiment.

As explained, according to the present invention, it is possible to provide a magnetic head supporting mechanism capable of providing a satisfactory state of contact between the magnetic heads and the magnetic disk, while maintaining individual parts in good condition.

It is to be noted that many modifications and variations of these embodiments may be made without departing from the novel and advantageous features of the present invention. For instance, the bridge connections may have slits, or the bridge connections can be arranged diagonally in any of the above embodiments. Accordingly, all such modifications and variations are intended to be included within the scope of the appended claims.

What is claimed is:

1. A magnetic head supporting mechanism for supporting a pair of magnetic heads to be brought into contact with a rotating magnetic disk from its top and bottom, comprising:

a carriage movable in a direction normal to a direction of rotation of the magnetic disk; and a pair of gimbal plate means, attached to the carriage, for supporting the magnetic heads on the carriage, each gimbal plate means including:

a head fixing portion on which one of the magnetic heads is mounted;

double thin plates surrounding the head fixing portion, including an inner thin plate and an outer thin plate;

a carriage fixing portion at which the gimbal plate means is attached to the carriage; and a plurality of bridge connections connecting the head fixing portion with the outer thin plate of the double thin plates, the outer thin plate of the double thin plates with the inner thin plate of the double thin plates, and the outer thin plate of the double thin plates with the carriage fixing portion, of which each of the bridge connections provided in the direction of the rotation of the magnetic disk is formed form substantially two bridges, while each of the bridge connections provided in the direction normal to the direction of the rotation of the magnetic disk is formed from a substantially single bridge, such that a spring constant in a direction around a rolling axis is larger than a spring constant in a direction around a pitching axis.

2. The mechanism of claim 1, wherein the double thin plates and the head fixing portion have octagonal shapes.

3. The mechanism of claim 2, wherein the octagonal shapes of the double thin plates and the head fixing portion have longer sides along the direction normal to the direction of rotation of the magnetic disk and shorter sides along the direction of rotation of the magnetic disks.

4. The mechanism of claim 1, wherein each of the inner thin plate and the outer thin plate of the double thin plates has portions tapering toward positions at which the two bridges of the bridge connections provided in the direction of the rotation of the magnetic disk are connected.

5. The mechanism of claim 1, wherein there is a shock absorber placed between the inner thin plate and the outer thin plate of the double thin plates.

* * * * *